United States Patent [19]

Gebelius

[11] 4,034,777
[45] July 12, 1977

[54] APPARATUS TO PIERCE A FLUID-TRANSPORT PIPE AND CONTROL THE FLUID-FLOW THEREFROM

[76] Inventor: Sven Runo Vilhelm Gebelius, Fridhemsgatan 27, Stockholm, Sweden, S-11240

[21] Appl. No.: 639,197

[22] Filed: Dec. 9, 1975

Related U.S. Application Data

[63] Continuation of Ser. No. 501,252, Aug. 28, 1974, abandoned.

[30] Foreign Application Priority Data

Sept. 10, 1973 Sweden .............................. 7312746

[51] Int. Cl.² ......................................... F16L 41/04
[52] U.S. Cl. ................................. 137/318; 137/320
[58] Field of Search ................... 137/318, 15, 320; 285/197

[56] References Cited

U.S. PATENT DOCUMENTS

| | | | |
|---|---|---|---|
| 3,428,075 | 2/1969 | Wagner | 137/318 |
| 3,495,615 | 2/1970 | Ehrens | 137/318 |

FOREIGN PATENT DOCUMENTS 289,891  6/1964  Australia ......................... 137/318

Primary Examiner—Alan Cohan

[57] ABSTRACT

Apparatus for creating holes in a transport pipe by means of explosive power is disclosed. The apparatus includes a guiding channel attached to the transport pipe with a hole piercing member inserted in the guiding channel, and with the hole piercing member connected to a maneuverable adjusting member which moves the hole piercing member toward and away from the transport pipe. A channel for carrying the explosive cartridge is provided in communication with the guiding channel and in position above the hole piercing member. Upon actuation, the explosive cartridge moves the hole piercing member at high speed toward the transport pipe to create a hole therein.

3 Claims, 4 Drawing Figures

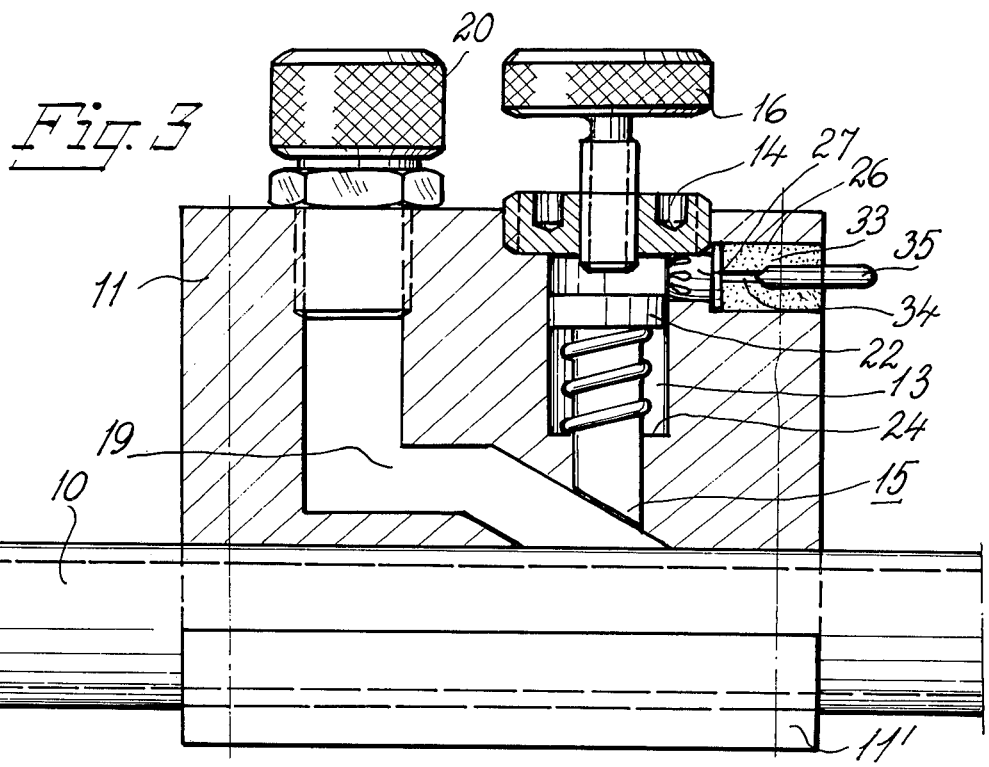
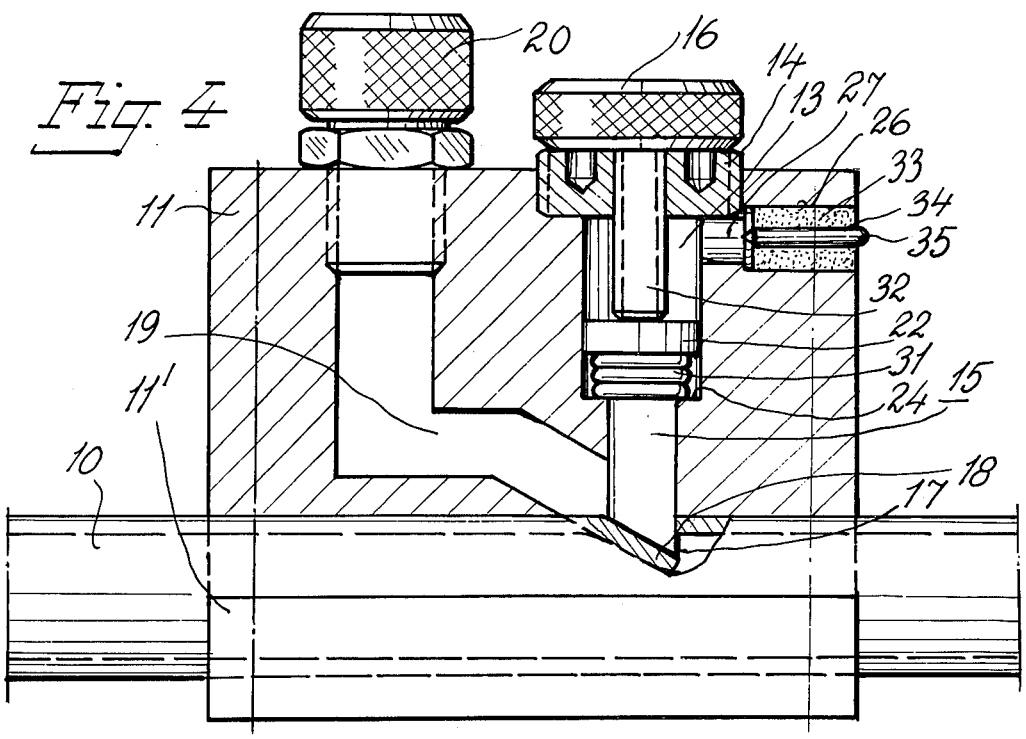

4,034,777

APPARATUS TO PIERCE A FLUID-TRANSPORT PIPE AND CONTROL THE FLUID-FLOW THEREFROM

This is a continuation of application Ser. No. 501,252, filed Aug. 28, 1974, now abandoned.

This invention relates to apparatus to pierce a hole in a transport pipe by means of explosive power. The invention also relates to a device for the use of the method.

The invention is a further development of the invention disclosed in Swedish patent application No. 7308865-0 which corresponds to copending U.S. patent application Ser. No. 481,471 filed June 20, 1974.

In Swedish patent application No. 7308865-0. is disclosed a method for arranging crosswisely extending pipe connections at a transport pipe for fluid gas or similar mediums, said method being mainly characterized by the fact, that seizing the transport pipes, at suitable distances along the length, are arranged pipe connection means, each one being connectable to one or more connection pipes. Each pipe connection means being arranged with one or more flow channels to the connection pipes and a guiding channel to the transport pipe, in which guiding channel a hole piercing member is inserted and under the influence of an applied force creates a hole in the transport pipe. The hole piercing member is connected to a maneuverable adjusting member arranged to move the piercing member in the guiding channel in a direction to and from the transport pipe, the edge portion of the hole in the transport pipe serving as a valve seat and one end portion of the hole piercing member serving as a valve face, acting against said valve seat. The hole piercing member is arranged to create the hole through the transport pipe under the influence of explosive power.

In the aforementioned patent application is also disclosed a pipe connection means to be used according to the method, said pipe connection means being arranged to take up a sealed contact with a transport pipe for fluid, gas or similar mediums, the pipe connection means being mainly characterized by the fact, that the pipe connecton means is arranged with one or a number of flow channels leading to connection pipes and a guiding channel leading to the transport pipe. The guiding channel is arranged with a hole piercing member, by means of which a hole into the transport pipe can be created, and that the hole piercing member is connected to a maneuverable adjusting member arranged to move the piercing member in the guiding channel in a direction to and from the transport pipe. The edge portion of the hole in the transport pipe serves as a valve seat and one end portion of the hole piercing member serving as a valve face, acting against said valve seat.

The aforementioned explosive power is intended to be created by means of bolt or nail impact guns, aimed against the free end portion of the hole piercing member and actuated to move same.

However, on many occasions it has been difficult to use nail or bolt impact guns for this purpose, since the pipe connections can be arranged within restricted areas of space, making it difficult and sometimes impossible to insert a nail or bolt impact gun and apply same to the hole piercing member. Furthermore, it is often difficult to keep a nail or bolt impact gun available for this purpose.

A need for a more suitable method to use explosive power for the aforementioned purpose has thus been created, since it has proven to be an extremely efficient method otherwise.

By means of a device according to the present invention, this requirement is met in a most simple and efficient way, mainly since nail and bolt explosive impact guns are no longer necessary to create an efficient result of operation.

The main characteristic features of the device according to the present invention are disclosed in the accompanying claims.

BRIEF DESCRIPTION OF THE DRAWINGS

Two embodiments of the device according to the present invention are more fully described below with reference to the accompanying drawings, in which FIGS. 1 and 2 disclose a first embodiment and FIGS. 3 and 4 a second embodiment.

FIG. 3 is a longitudinally extending cross-section of a pipe connection means, fixed to a transport pipe. The explosive charge is arranged in a channel extending through the pipe connection means.

FIG. 4 is a view corresponding to FIG. 3, but showing the explosive charge released and the transport pipe pierced.

DESCRIPTION OF THE PREFERRED EMBODIMENTS

Figure 1:
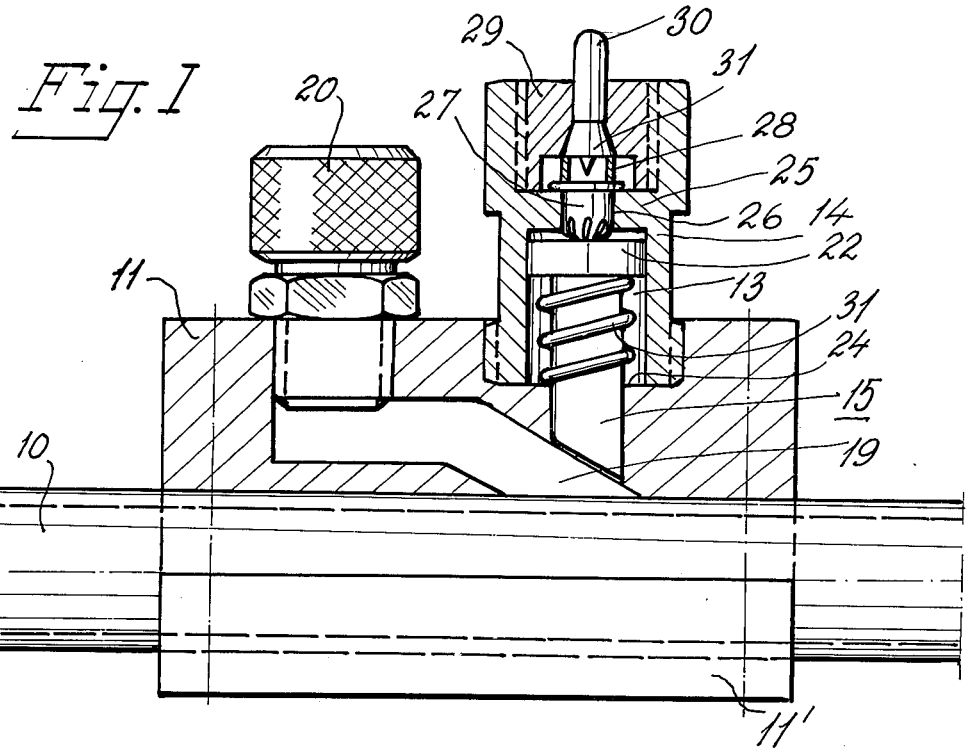
FIG. 1 is a longitudinally extending cross-section of a pipe connection means, fixed to a transport pipe and with an explosive charge arranged in a guiding member at the pipe connection means, said explosive charge being released.

Since the design of the pipe connection means and the hole piercing member mainly correspond to and function as disclosed in the specification and claims of patent application No. 7308865-0, generally corresponding reference numerals have been used for corresponding elements, and a description of these elements and their function has not been included below.

Figure 2:
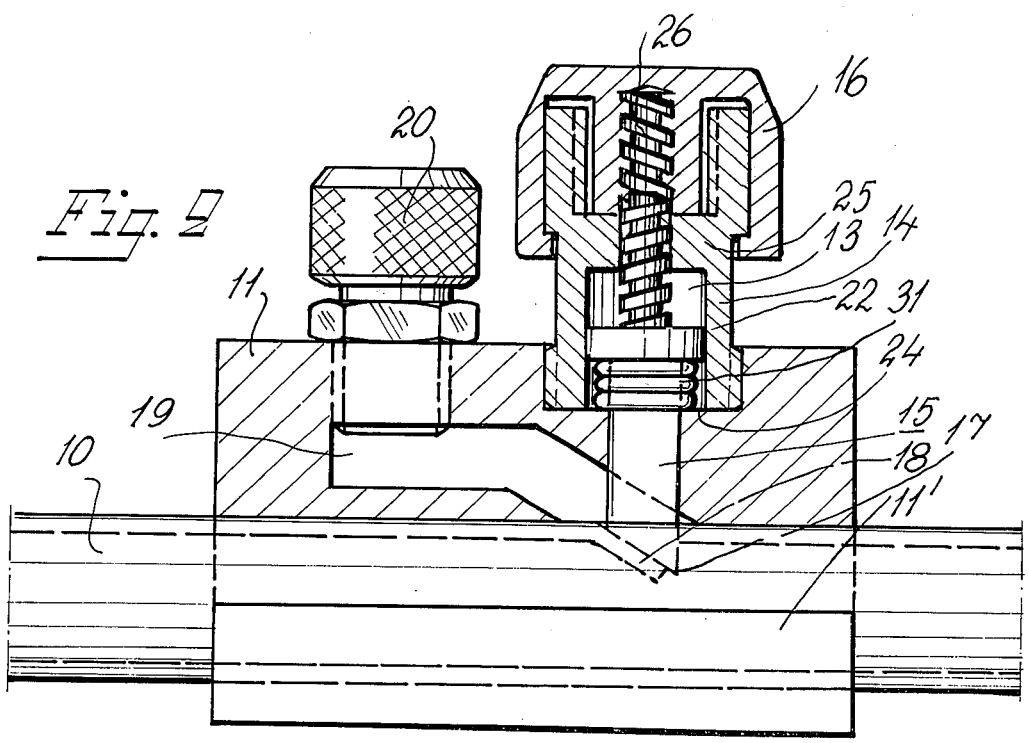
FIG. 2 is a view corresponding to FIG. 1, but with explosive charge released and a maneuverable adjusting member arranged by the guiding member.

In the embodiment shown in FIGS. 1 and 2, the guiding member 14 is arranged with a crosswisely extending wall portion 25 at the upper inside part, with a centrally located channel 26, in which an explosive charge 27 in insertable and fixed by means of a ring 28 of easily demolishable material, e.g., plastics. Said ring 28 is fixed to a nutshaped member 29, which can be fixed by means of a screw thread in the upper portion of the guiding member 14, said member 29 also being arranged with a movable impact member 30, having a pointed end portion 30: directed towards the explosive charge 27.

When the impact member 30, by means of a hammer or other suitable object, is made subject to force, the ring 28 breaks and the pointed end portion 30: is brought into contact with the explosive charge 27, which explodes, thus creating a rapid gas flow in the guiding channel 13. The hole piercing member 15 is thereby moved at high speed towards the transport pipe 10, thus creating a hole 17 in same. Between the flange 22 of the hole piercing member 15 and the stop member 24 is arranged a pressure acting helical spring 31, acting to move the free end portion of the hole piercing member 15 towards the explosive charge 27. The mass of said spring 31 has such a height, that it prevents the hole piercing member 15 from being moved past a predetermined fixed position.

When the hole 17 has been pierced in the transport pipe 10, the nutshaped member 29 and the charge cartridge are removed, whereafter an adjusting member 16, having a threaded spindle 32, is attached to the guiding member 14. The lower end portion of said spindle 32 is arranged to take up contact with the flange 22 of the hole piercing member 15, whereby the hole piercing member 15 can be adjustably moved, thus adjusting the flow of liquid or gas through the hole 17 in the transport pipe 10 to a passage 19 and coupling 20. The lower angular end of piercing member 15 cooperates with a complementary portion 18 struck from the fluid-conducting pipe 10 to form a valve seat.

The embodiment shown in FIGS. 3 and 4 is principally similar to the first embodiment intended for piercing a transport pipe 10. The channel 26 for the explosive cartridge 27, the cartridge 27 being arranged in one part 11 of the pipe connection means, said cartridge 27 being held in position in the channel 26 by means of a sealing member 33 of a relatively soft material, e.g. lead or similar materials. A centrally spaced channel 34 is arranged in the aforementioned sealing member 33, directed towards the cartridge 27. A firing pin 35, directed towards the cartridge 27, is pressed into said channel 34.

Before the cartridge 27 is brought to explode, the firing pin is only partly pressed into the channel 34, as shown in FIG. 3. To create an explosion, the firing pin 35 is driven towards the cartridge 27 by means of a hammer or similar object. The firing pin 35 is thus pressed against the sealing member 33, holding same in position in the channel 26, and the empty cartridge need not be removed.

Since the explosive cartridge 27 and the activating members 30, 30: or 35 are arranged within the pipe connection means 11, 11: before delivery to a work site, only a simple means for an impact blow is necessary, e.g. a hammer or similar object, to create effectively a pipe connection to a transport pipe 10 for fluid, gas or similar mediums.

I claim:

1. Apparatus for piercing and controlling fluid-flow from a pipe, comprising:
    a. pipe connection means;
    b. a fluid-conducting pipe extending through said pipe connection means,
    said pipe connection means including at least one fluid-flow channel having an end portion opening to the outer surface of said fluid-conducting pipe where it is to be pierced, said pipe connection means including a guide channel intersecting said one fluid-flow channel and merging therewith at the outer surface of said fluid-conducting pipe, said fluid-flow channel extending angularly toward the longitudinal axis of said fluid-conducting pipe;
    c. a percussion-operated, piercing member reciprocably supported in said guide channel and including a lower, transversely inclined end surface defining a lower piercing edge and point for penetrating the fluid-conducting pipe and displacing a portion therein comprising a flow-controlling flap extending angularly from the end of said fluid-flow channel into angular relation with respect to the longitudinal axis of said fluid-conducting pipe;
    d. percussion-chamber means communicating with the upper end of said guide channel for accommodating an explosive charge for imposing a percussive force on the piercing member to drive it through the pipe, said displaced portion being complementary to the lower end surface of said piercing member and forming a valve seat when engaged by the lower end surface of said piercing member, said valve seat including said flow-controlling flap and said flap extending transversely and angularly into the direction of fluid-flow through the pipe;
    e. spring means interposed between said piercing member and said pipe connection means for limiting movement of said piercing member through the pipe to cause the valve seat to be formed and normally urging the piercing member away from said pipe; and
    f. an adjusting member including a manually-adjustable stem means engaged with said piercing member for adjusting the lower end surface of said piercing member relative to said flow-controlling flap for controlling fluid flow from the pipe to said one channel of the connection member.

2. The structure as claimed in claim 1 in which said percussive chamber means comprises a separate unit removably and axially mounted on the connection member above said piercing member and guide channel, said adjusting member including a substitute unit rotatably mounted on said connection member above the piercing member, said adjusting member including said spindle, said spindle being threadedly connected to said rotatable substitute unit.

3. The structure as claimed in claim 1 in which said percussion chamber means communicates laterally with said guide channel above said piercing member, said adjusting member comprising a rotatable element mounted on said connection member above said piercing member, said stem being operatively connected to said rotatable member and axially projectionable from said rotatable member towards said piercing member.

* * * * *